United States Patent [19]
Lecuru et al.

[11] 3,810,329
[45] May 14, 1974

[54] CELLULAR TRAYS FOR CULTIVATING AND DISPLAYING PLANTS

[76] Inventors: Jacques Lecuru; Jean Cassa, both of 2 Gillocourt, Orrouy, Oise, France

[22] Filed: June 6, 1972

[21] Appl. No.: 260,256

[30] Foreign Application Priority Data
July 2, 1971 France .................. 71.24763

[52] U.S. Cl. .......... 47/34.13, 229/28 R, 206/46 FC
[51] Int. Cl. .................................. A01g 9/02
[58] Field of Search ................. 47/34, 34.13, 37

[56] References Cited
UNITED STATES PATENTS
| | | | |
|---|---|---|---|
| 2,867,946 | 1/1959 | Kobs | 47/34.13 X |
| 2,957,274 | 10/1960 | Colvin | 47/34.13 X |
| 3,543,437 | 12/1970 | Gaines | 47/34 |
| 3,667,159 | 6/1972 | Todd | 47/34.13 |

FOREIGN PATENTS OR APPLICATIONS
1,268,626   6/1961   France

*Primary Examiner*—Robert E. Bagwill
*Attorney, Agent, or Firm*—Karl F. Ross; Herbert Dubno

[57] ABSTRACT

A cellular tray for receiving a plurality of rows of flower plants or the like for cultivating or displaying them comprises alternate frustoconical cavities for receiving said plants in pots or the like and frustoconical holes constituting respective ventilating shafts for aerating the undersides of the leaves of the plants received therein, each hole being disposed at the center of a circle, along which the axes of four pot-receiving cavities are disposed with a 90° spacing, each cavity having its minor base opening at the bottom face of the tray and its major base opening at the top face of the tray. The holes have opposite tapers and comprise at their upper end a collar projecting from the top face of the tray. This tray further comprises a projecting marginal portion. Grooves formed in the lateral walls of the cavities facilitate the draining of water through the cavities alone.

4 Claims, 4 Drawing Figures

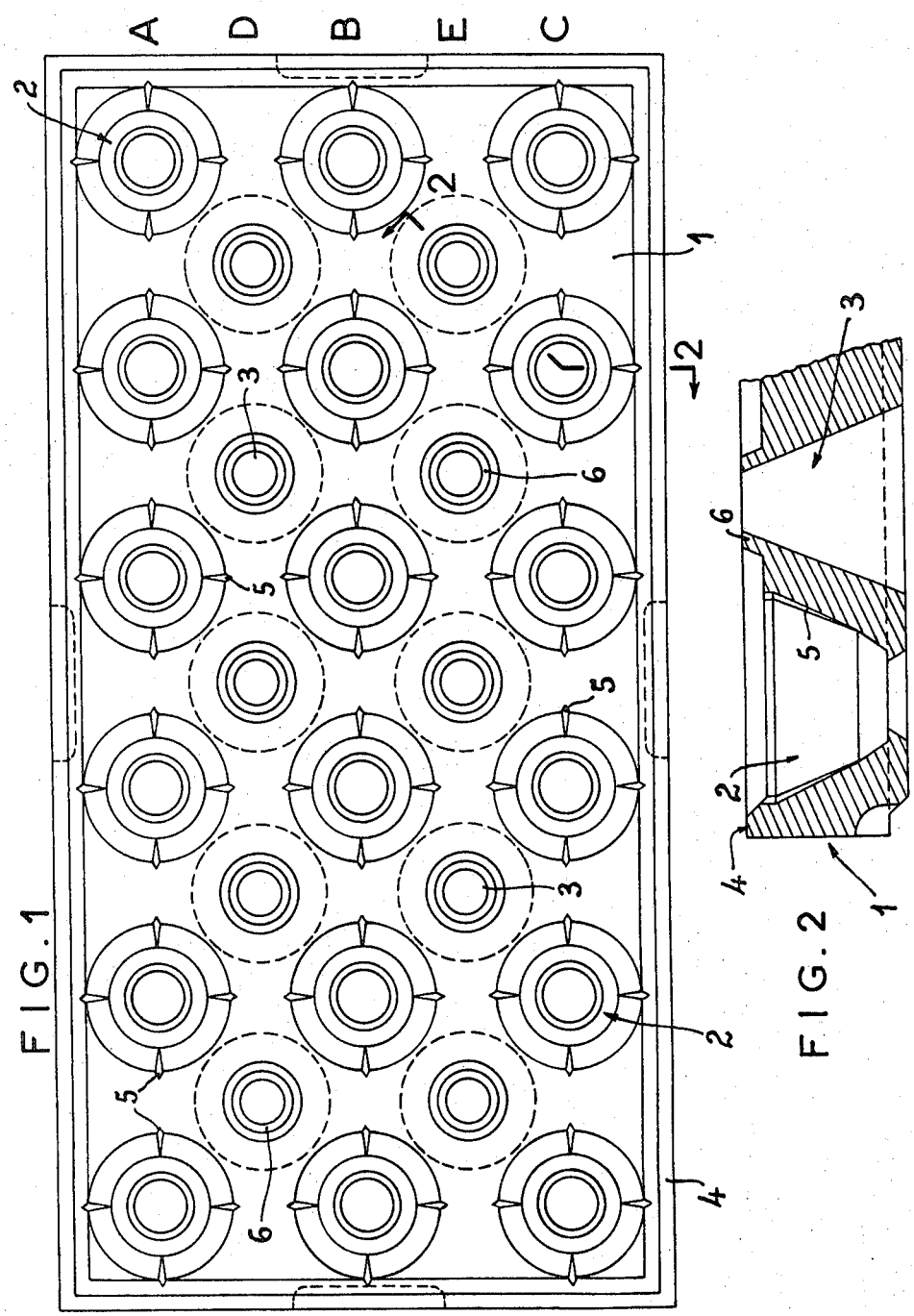

CELLULAR TRAYS FOR CULTIVATING AND DISPLAYING PLANTS

BACKGROUND OF THE INVENTION

1. Field of the Invention

The present invention relates to cellular trays for cultivating and displaying plants and more particularly, flowers in pots.

2. Summary of the Invention

The tray according to this invention comprises essentially a cellular plate in which there are formed at least two rows of frustoconical cavities opening individually at their minor bases along the lower face or bottom face of the plate and at their major bases along the top or upper face of the plate, and each adapted to receive a flower pot or the like; in addition the tray has at least one row of frustoconical holes tapering in the direction opposite that of the taper of said cavities. Each hole extends through the plate and lying in close proximity of said cavities to constitute ventilating shafts whereby air is induced to circulate under the plant leaves.

The relative arrangement and number of said cavities and ventilation holes are immaterial. However, according to a preferred embodiment of this invention, each ventilation hole is disposed at the center of a circle along which the axes of four pot cavities are angularly equispaced at 90° intervals.

According to a specific feature of this invention, the marginal portion of the plate constituting the cellular tray and the top of the ventilation holes project somewhat above the general level of the plate proper, so that any sprinkling water will be collected by the top surface of the plate and can escape only through the pot-receiving cavities. To facilitate the draining of water towards the pots, narrow slots are formed in the internal surface or wall of each pot-receiving cavity.

DESCRIPTION OF THE DRAWING

FIG. 1 is a plan view from above of the cultivating tray,

FIG. 2 is a fragmentary section taken along the line 2—2 of FIG. 1; and

SPECIFIC DESCRIPTION

Figure 3:
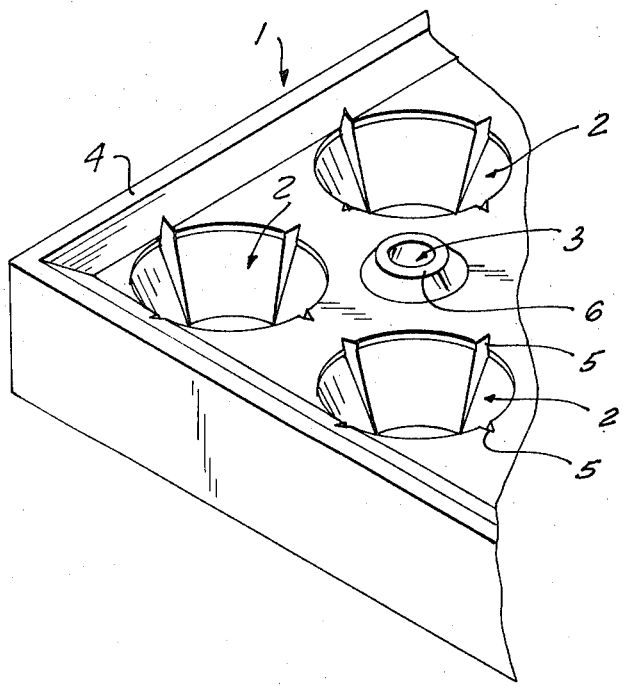
FIGS. 3 and 4 are respectively a top and bottom perspective view of a fragment of the tray.
Figure 4:
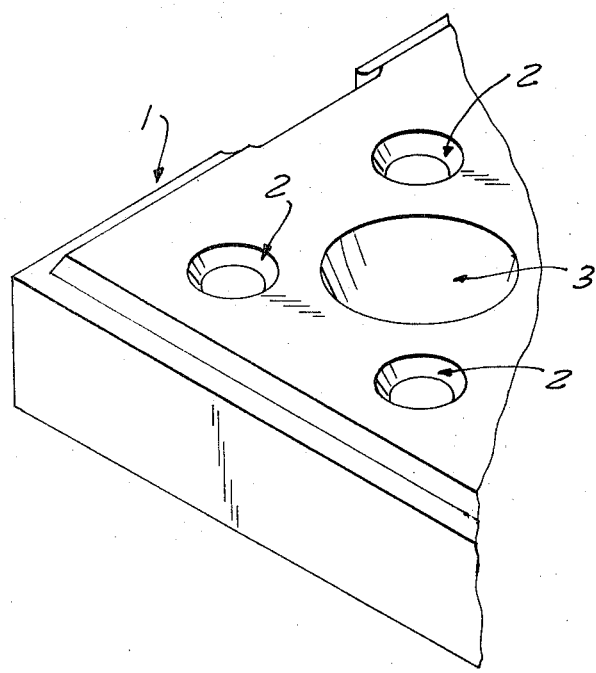

The cellular tray for cultivating and displaying plant varieties, notably flowers and the like, according to this invention, comprises essentially a plate 1 of plastic material, preferably and advantageously of the material known under the Trademark "STYROPOR". This plate 1 comprises advantageously but not compulsorily five rows of cavities and holes, formed preferably by molding and constituting preferably:

three rows A, B and C, respectively, of six cavities 2 each, and two rows D and E, respectively, of five holes 3 respectively.

Each cavity 2 is of substantially frustoconical configuration and opens at its minor base into the lower or bottom face of plate 1, and at its major base into the upper or top face of plate 1; however, it will be seen that this top face of plate 1 is somewhat recessed in relation to the peripheral marginal portion 4 of the plate. Each cavity 2 is adapted to receive a flower pot or any other suitable container for cultivating any desired plant variety.

The holes 3 have likewise a frustoconical configuration but opposite to that of said cavities 2. In fact, their major bases open at the lower or bottom face of plate 1, and their minor bases open into the upper or top face thereof; however, it will be seen that at the top of each hole 3 the plate 1 comprises a neck portion 6 projecting above the top surface of the plate. Each hole 3 is adapted to act as a ventilation shaft in order to facilitate the circulation of atmospheric air under the leaves of the plants supported by the tray.

It may also be seen that this air circulation and therefore the plant ventilation takes place under the best possible conditions due to the particular arrangement of the ventilation holes 3 acting as air shafts. Each hole 3 is disposed to this end concentrically to a circle on which the centers of four cavities 2 adapted to receive the flower pots or the like are disposed at spaced intervals, i.e., at a 90° angular spacing.

The collars 6 constituting the top portion of each hole 3, i.e., the ventilation shafts, are adapted to retain on the surface of plate 1 any sprinkling water sprayed thereon so as to prevent this water from flowing directly through the ventilation holes 3.

In order to facilitate the flow of any sprinkling water towards each pot received in said cavities 2, small slots or grooves 5 are formed by molding in the lateral walls of said cavities 2 receiving the flower pots.

Of course, various modifications and variations may be brought to the specific form of embodiment of the invention which is shown and described herein, without departing from the basic principle of the invention as recited in the appended claims.

I claim:

1. A tray comprising a generally flat rectangular parallelo-pipedal solid body defined between a top face, a bottom face and four imperforate lateral faces bounding said body on the four lateral sides therof, said body being formed with a plurality of rows of frustoconical cavities each adapted to receive a potted plant, each of said cavities having a large-diameter base opening substantially at said top face and a small-diameter base opening substantially at said bottom face, said tray being further formed with a multiplicity of throughgoing frustoconical holes tapering in a direction opposite to the direction of taper of said cavities for ventilating the underside of the leafs of plants in pots received in said cavities, said holes each having a small-diameter base opening substantially at said top surface and a large-diameter base opening substantially at said bottom surface, said top and bottom surfaces being substantially imperforate except for the openings of said holes and cavities.

2. The tray defined in claim 1 wherein said holes are provided in rows between the rows of said cavities and each of said holes has an axis lying at a center of a circle along which the axes of four of said cavities are disposed with 90° spacing.

3. The tray defined in claim 2 wherein said body is provided along its periphery with an upstanding ledge and each of said small-diameter bases of said holes is formed with an annular collar projecting above the large-diameter bases of said cavities.

4. The tray defined in claim 3 wherein said body is formed at each of said cavities with a plurality of angularly spaced axially extending narrow grooves reaching substantially from the large-diameter bases of said cavities downwardly to a location above the small-diameter bases thereof.

* * * * *